(12) United States Patent
Hill

(10) Patent No.: US 9,321,122 B2
(45) Date of Patent: Apr. 26, 2016

(54) SPOT WELDING TIP FOR A SPOT WELDING MACHINE

(75) Inventor: John E. Hill, Shelby Township, MI (US)

(73) Assignee: Magna International Inc., Aurora, Ontario (CA)

( * ) Notice: Subject to any disclaimer, the term of this patent is extended or adjusted under 35 U.S.C. 154(b) by 1532 days.

(21) Appl. No.: 12/090,924

(22) PCT Filed: Dec. 6, 2005

(86) PCT No.: PCT/CA2005/001848
§ 371 (c)(1),
(2), (4) Date: Apr. 21, 2008

(87) PCT Pub. No.: WO2007/065238
PCT Pub. Date: Jun. 14, 2007

(65) Prior Publication Data
US 2008/0296267 A1 Dec. 4, 2008

(51) Int. Cl.
*B23K 35/02* (2006.01)
*B23K 11/30* (2006.01)

(52) U.S. Cl.
CPC ................... *B23K 11/3009* (2013.01)

(58) Field of Classification Search
CPC .... B23K 11/30; B23K 11/3009; B23K 35/00; B23K 35/02; B23K 35/0205; B23K 35/0255; B23K 35/0277
USPC .................................................. 219/119, 120
See application file for complete search history.

(56) References Cited

U.S. PATENT DOCUMENTS

| 2,389,945 A | 11/1945 | Wisler |
| 2,489,993 A | 11/1949 | Wood |
| 2,780,718 A | 2/1957 | Mullen |
| 3,525,848 A | 8/1970 | Bugaj |
| 3,798,405 A | 3/1974 | Boothe |
| 3,909,581 A | 9/1975 | Stone et al. |
| 4,388,516 A | 6/1983 | Ferrero et al. |
| 4,610,153 A | 9/1986 | Nedorezov |
| 4,728,765 A | 3/1988 | Prucher |
| 4,760,235 A | 7/1988 | Flater |
| 4,788,407 A | 11/1988 | Flater |
| 4,835,356 A | 5/1989 | Abe |
| 4,954,687 A | 9/1990 | Bush et al. |
| 5,015,816 A | 5/1991 | Bush et al. |
| 5,126,528 A * | 6/1992 | Bush et al. ................. 219/119 |
| 5,155,320 A | 10/1992 | Simmons |

FOREIGN PATENT DOCUMENTS

| GB | 596132 | 12/1947 |
| JP | 358159984 | 9/1983 |
| JP | 401186286 A | 7/1989 |
| JP | 410128554 A | 5/1998 |

* cited by examiner

*Primary Examiner* — Brian Jennison
(74) *Attorney, Agent, or Firm* — Dickinson Wright PLLC

(57) ABSTRACT

A spot welding tip for use in a spot welding machine includes a base portion having a longitudinal base axis that passes through a center of the base portion. A tip portion extends from the base portion and provides a contact surface. The tip portion includes a longitudinal tip axis that passes through a center of the tip portion and a center of the contact surface. The spot welding tip includes a transverse axis that is perpendicular to both the base axis and the tip axis. The base axis and the tip axis are parallel to one another and offset from one another by a length. The contact surface is angled with respect to the transverse axis by an angle.

19 Claims, 4 Drawing Sheets

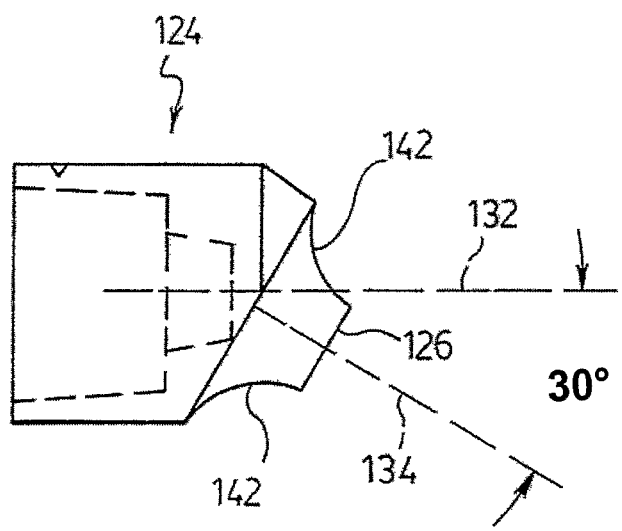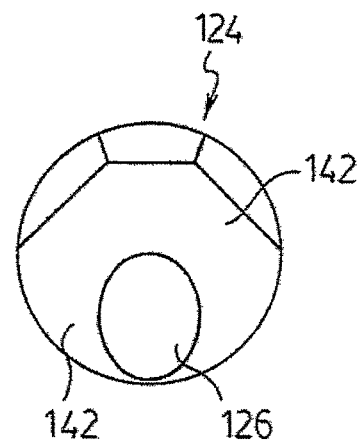
FIG.5.  FIG.6.
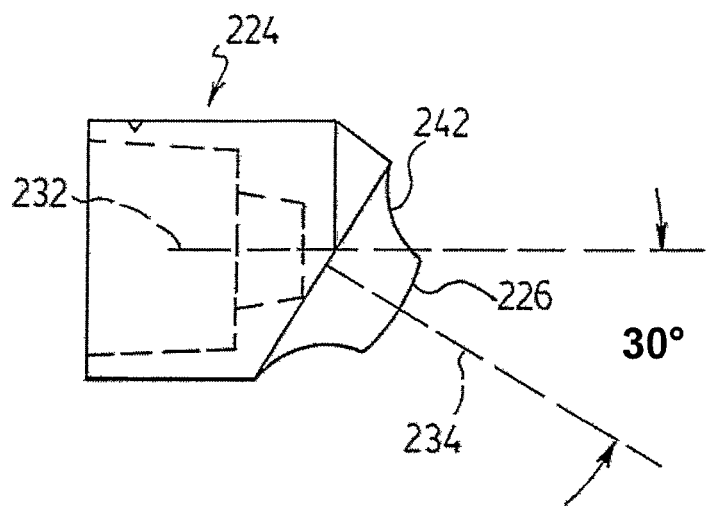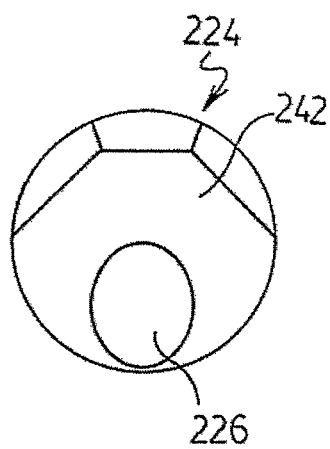
FIG.7.  FIG.8.

SPOT WELDING TIP FOR A SPOT WELDING MACHINE

FIELD OF THE INVENTION

The present invention relates to a welding tip for a welding machine.

BACKGROUND OF THE INVENTION

Spot welding of a secondary part to a closed section part, preferably formed by hydroforming can be accomplished by a spot welding assembly as disclosed in United States Patent Publication no. 2004/0065641. In this apparatus, the electrodes are positioned on opposite sides of the closed section part, sandwiching the secondary part therebetween. Application of electrical current welds the two components together.

This apparatus works well in applications where the secondary part wraps about the closed section part so that the two electrodes can contact from opposite sides of the closed part. However, in other applications where the secondary part does not wrap, it is very difficult to insert the electrode in the closed section and position the tip in more remote regions inside of the closed section.

SUMMARY OF THE INVENTION

One aspect of the invention relates to a welding tip for use in a welding machine, the welding tip comprising: a base portion including a longitudinal base axis that passes through a center of the base portion; and a tip portion extending from the base portion and providing a contact surface, the tip portion including a longitudinal tip axis that passes through a center of the contact surface, a transverse axis being perpendicular to both the base axis and the tip axis, the base axis and the tip axis being substantially parallel to each other and spaced from each other, and the contact surface being inclined with respect to the transverse axis by an angle.

Another aspect of the invention relates to a welding apparatus, comprising: an electrode rod; and a welding electrode detachably connected to the electrode rod, the welding electrode including a mounting portion structured to detachably connect the welding electrode to the electrode rod and a welding tip projecting from the mounting portion, the welding tip including: a base portion including a longitudinal base axis that passes through a center of the base portion; and a tip portion extending from the base portion and providing a contact surface, the tip portion including a longitudinal tip axis that passes through a center of the contact surface, a transverse axis being perpendicular to both the base axis and the tip axis, the base axis and the tip axis being substantially parallel to each other and spaced from each other, and the contact surface being inclined with respect to the transverse axis by an angle.

Still another aspect of the invention relates to a welding tip for use in a welding machine, the welding tip comprising: a base portion including a longitudinal base axis that passes through a center of the base portion; and a tip portion extending from the base portion and having means for enabling the tip portion to contact portions of welding material at inconvenient locations.

Still another aspect of the invention relates to a welding tip for use in a welding machine, the welding tip comprising: a base portion including a base axis that passes through a center of the base portion; and a tip portion extending from the base portion and providing a contact surface, the tip portion including a tip axis that passes through the contact surface, a transverse axis being perpendicular to both the base axis and the tip axis, the base axis and the tip axis being substantially parallel to each other and spaced from each other, and the contact surface being inclined with respect to the transverse axis by an angle and the contact surface being asymmetric with respect to the base axis.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings:

FIG. 5 is a side view of welding tip according to another embodiment in accordance with the invention;

FIG. 6 is a bottom view of the welding tip illustrated in FIG. 5;

FIG. 7 is a side view of welding tip according to yet another embodiment in accordance with the invention; and FIG. 8 is a bottom view of the welding tip illustrated in FIG. 7.

DETAILED DESCRIPTION OF ILLUSTRATED EMBODIMENTS

Figure 1:
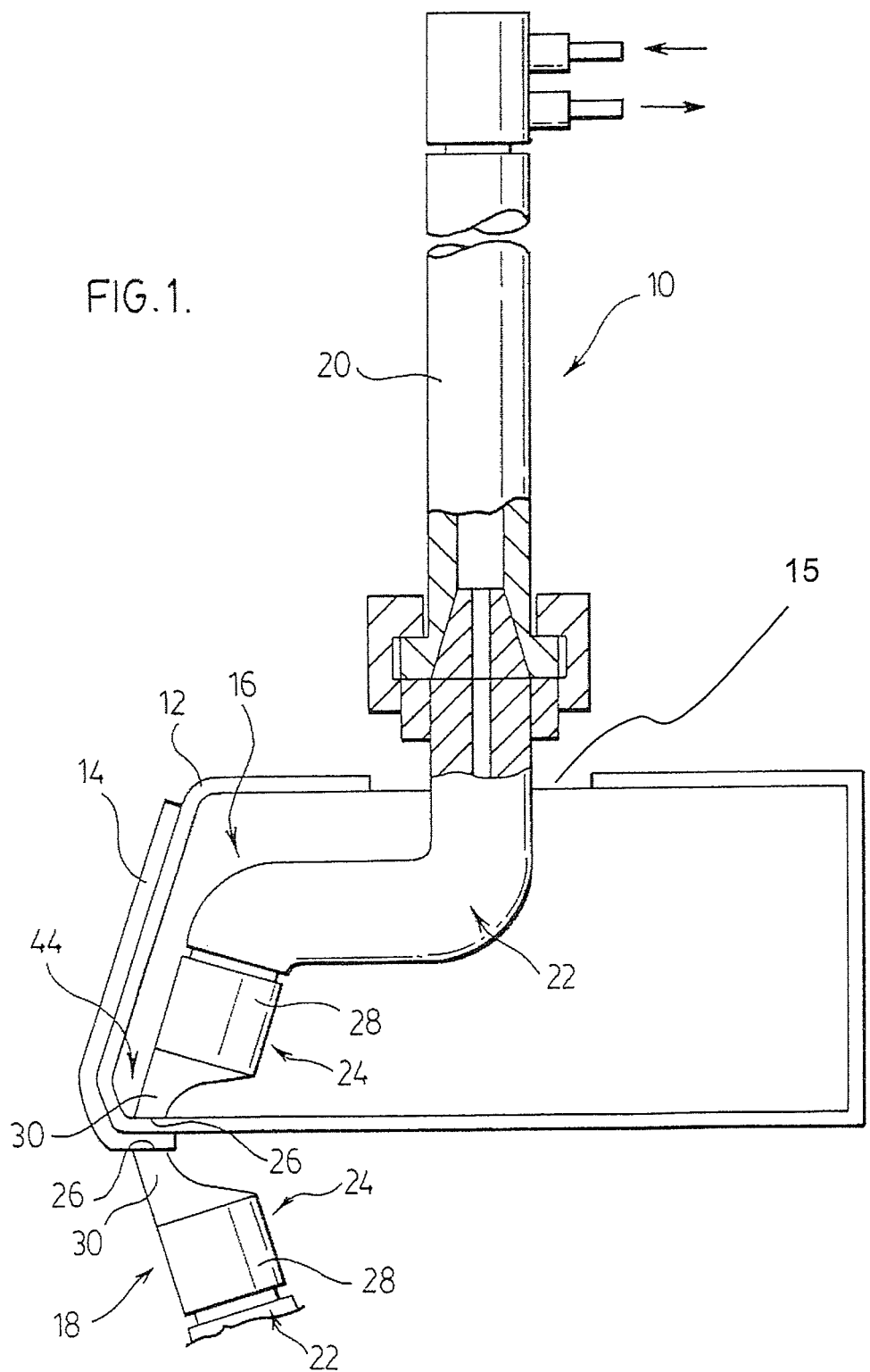
FIG. 1 is a side view illustrating a resistance spot welding machine including a spot welding electrode with a spot welding tip constructed in accordance with an embodiment of the invention.

FIG. 1 illustrates a resistance spot welding machine 10 structured to join a closed section 12 and a reinforcement sheet 14 together by resistance spot welding. Closed section 12 is a hydroformed metal part having a closed cross section and an aperture 15 formed therein. Aperture 15 provides access to the interior of the closed section 12. The particular function of the hydroformed part determines the location, size and position of the reinforcement sheet 14, limiting the location of the weld that joins the two components together.

The spot welding machine 10 includes first and second spot welding electrodes 16, 18 that are each detachably connected to an electrode rod 20 (only one being illustrated) of the machine 10. However, the spot welding electrodes 16, 18 may be utilized on any suitable welding machine, including any suitable spot welding machine. As is conventional, the spot welding electrodes 16, 18 are brought together under pressure on opposite sides of the two thin metal sheets 12, 14 and a high electrical current is passed between the spot welding electrodes 16, 18 through the two thin metal sheets 12, 14 to fuse the two thin metal sheets 12, 14 together. Examples of prior art spot welding electrodes are disclosed in U.S. Pat. Nos. 4,760,235; 5,015,816; and 5,126,528, each of which is incorporated herein by reference thereto, respectively.

Each spot welding electrode 16, 18 includes a mounting portion 22 and a spot welding tip 24 constructed according to an embodiment of the present invention. The mounting portion 22 is structured to detachably connect each spot welding electrode 16, 18 to the respective electrode rod 20 of the spot welding machine 10. In the illustrated embodiment, the mounting portion 22 has a bent configuration in order to properly position the respective spot welding tip 24 to the desired spot welding position on the metal sheets 12, 14. However, the mounting portion 22 may have any suitable construction and configuration to properly position the respective spot welding tip 24.

The spot welding tip 24 projects from the mounting portion 22 and includes a contact surface 26 structured to engage the respective metal sheet 12, 14 during the spot welding process. The mounting portion 22 and spot welding tip 24 may be integrally formed in one piece with one another to form a one-piece spot welding electrode 16, 18. Alternatively, the spot welding tip 24 may be formed separately from the mounting portion 22 and detachably coupled thereto.

The spot welding tip 24 is structured to enable access to welding areas and metal sheet trims that are typically inaccessible by conventional welding tips. Moreover, the increased accessibility of the spot welding tip 24 enables smaller trims to be used.

Figure 2:
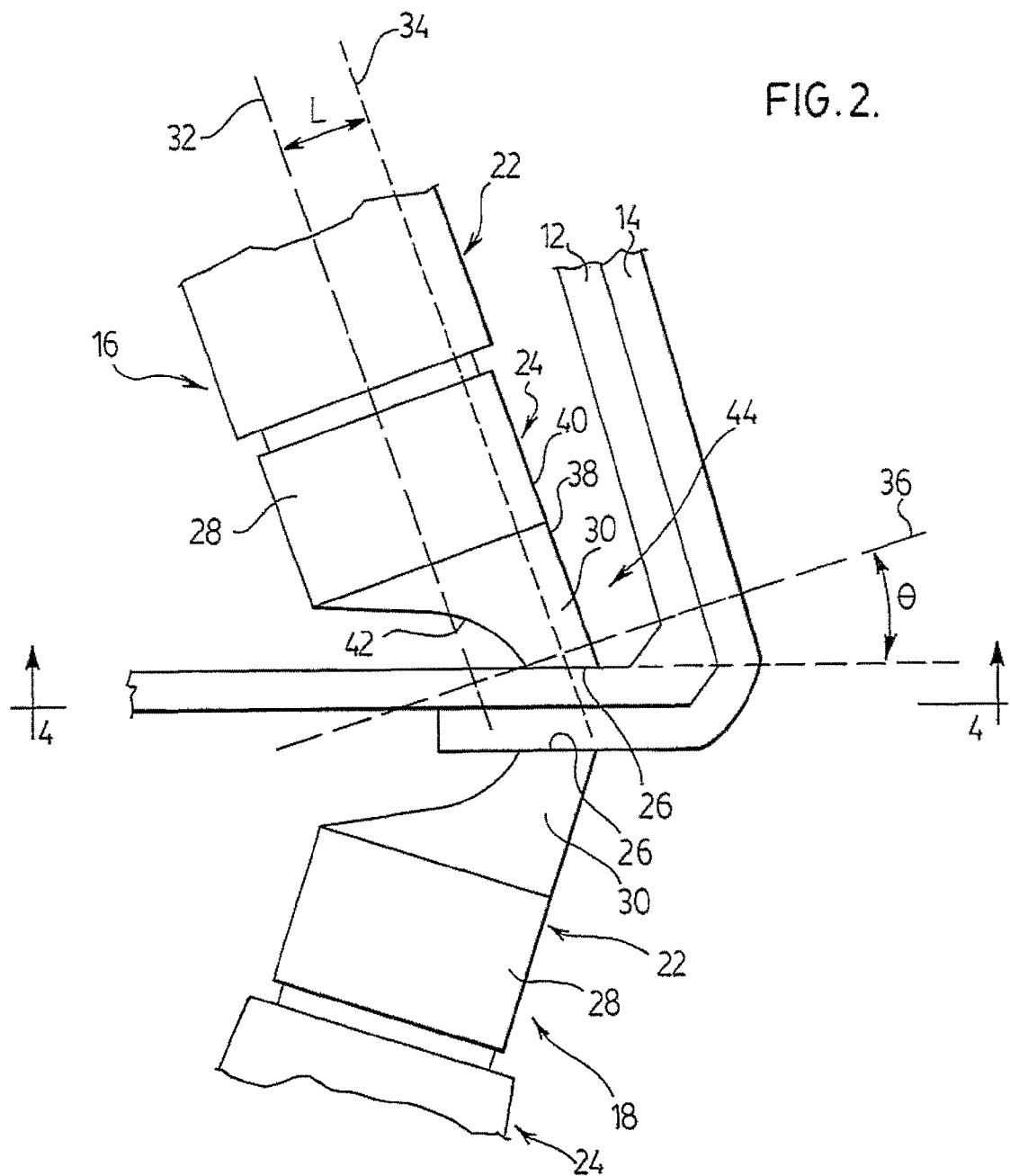
FIG. 2 is an enlarged side view illustrating the spot welding tip shown in FIG. 1.

As best shown in FIG. 2, the spot welding tip 24 includes a base portion 28 and a tip portion 30 extending from the base portion 28. The spot welding tip 24 is structured such that the tip portion 30 is axially offset from the base portion 28. Specifically, the base portion 28 includes a longitudinal base axis 32 that passes through a center of the base portion 28. The tip portion 30 includes a longitudinal tip axis 34 that passes through a center of the tip portion 30 and a center of the contact surface 26. As illustrated, the base axis 32 and the tip axis 34 are parallel to one another and offset from one another by a length L.

In the illustrated embodiment, one side of the tip portion 30 has an outer surface 38 that is co-extensive with the adjacent outer surface 40 of the base portion 28. The opposite side of the tip portion 30 has a tapered configuration that tapers inwardly between a lower shoulder of the base portion 28 and the contact surface 26 to form a concave surface 42. This concave surface 42 forms a tip with a D-nose due to the concavity of 42. The concave surface 42 permits a concentrated tip at surface 26 and keeps the rest of the tip from contacting the welded material 12. It is contemplated that the surface 38 may be tapered or angled between a lower shoulder of the base portion 28 and the contact surface 26.

The spot welding tip 24 is also structured such that the contact surface 26 is offset from a transverse axis of the spot welding tip 24. Specifically, the spot welding tip 24 includes a transverse axis 36 that is perpendicular to both the base axis 32 and tip axis 34. As illustrated, the contact surface 26 is angled with respect to the transverse axis by an angle θ. In the illustrated embodiment, the angle θ is about 30°.

As illustrated in FIG. 2, the outer surface of the base portion 28 continues as the outer surface of the tip portion 30. This enables the contact surface 26 to begin at the extreme edge of the welding tip 24. With the contact surface 26 extending to the extreme edge of the welding tip 24, the welding tip 24 can be positioned to previously unreachable locations, such as the one illustrated in FIG. 2. As seen in FIG. 2, if the contact surface 26 was centrally located and symmetric with respect to the longitudinal axis 32 of the base portion 28, the position of the contact surface of the welding tip 24 would be further spaced from the upstanding corner (further to the left as seen in FIG. 2) of the materials to be welded. Thus, the configuration of the welding tip 24 as illustrated in FIG. 2, permits a weld to occur closer to the upstanding edge of the material to be welded than previous weld tip configurations. Also, the shape of the tip 24 permits the user to do touch-up welding on previous welds not originally deemed to be satisfactory. The weld tip 24 can be manufactured as a new item or can be manufactured by the reshaping of existing, known weld tips.

Figure 3:
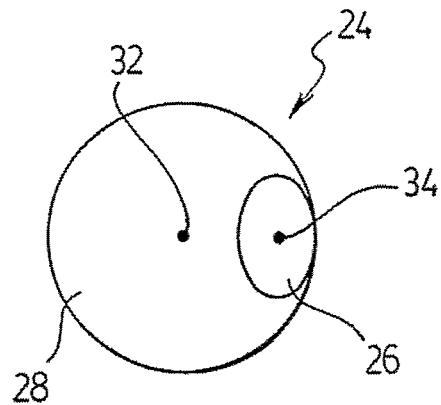
FIG. 3 is a bottom view of a welding tip in accordance with an embodiment of the invention.
Figure 4:
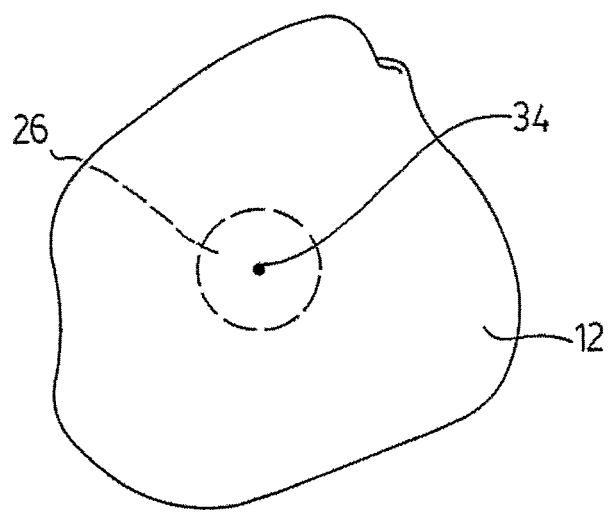
FIG. 4 is a view of the welding tip taken along line 4-4 in FIG. 2.

The contact surface 26 configuration can take various forms as desired. In addition to being set at various angles and being positioned in any manner of locations with respect to the base axis 32, the contact surface 26 can be shaped as desired. For example, the contact surface 26 can be configured to be elliptical when viewed along the axis 34 as seen in FIG. 3 while being circular when viewed along an axis that is substantially perpendicular to the plane of the contact surface 26, which provides a circular welding tip footprint as seen in FIG. 4. Other shapes for the contact surface 26 are possible including square and rectangular.

It should be understood that the spot welding tip 24 illustrated is only exemplary, and the offset length L and offset angle θ may be suitably varied to meet the certain access requirements for a particular spot welding procedure. Also, the size and shape of the contact surface 26 may vary depending on the size and shape of the spot weld.

The spot welding tip 24 with offset tip portion 30 and offset contact surface 26 is able to access areas that are inaccessible by conventional spot welding tips, e.g., centerline spot welding tips wherein the axis of the tip portion is aligned with the axis of the base portion. As shown in FIGS. 1 and 2, the thin metal sheets 12, 14 to be joined are bent to form an inner acute-angled area 44. The spot welding tip 24 is able to reach within the area 44 of the bent metal sheets 12, 14 because of its offset configuration. Specifically, the tip portion 30 is offset in order to position the contact surface 26 adjacent the outermost edge of the spot welding tip 24 so that the base portion 28 does not restrict placement of the contact surface 26 within a confined area, e.g., area 44. Moreover, the contact surface 26 is suitably offset so that the contact surface 26 can engage the respective metal sheet 12, 14, and the base portion 28 and remaining tip portion 30 will extend outwardly away from the contact surface 26 at an angle that will not engage remaining portions of the metal sheets 12, 14.

Other configurations for welding tips are illustrated in FIGS. 5 and 6 and in FIGS. 7 and 8. FIGS. 5 and 6 illustrate welding tip 124, which is similar to tip 24 except that the contact surface 126 is centered about the tip axis 134 and the contact surface 126 is substantially perpendicular to the tip axis 134. As with the contact surface 26, contact surface 126 is substantially circular in cross-section and when viewed along the tip axis 134. Concave surfaces 142 surround contact surface 126 and form a "D" shape in that the concave surface 142 forms the arc of the letter "D." Although the tip axis 134 is illustrated as being 30 degrees from the longitudinal base axis 132, other angles are possible, including, for example, 15 degrees.

FIGS. 7 and 8 illustrate welding tip 224, which is similar to tip 124 except that the contact surface 226, which is centered about the tip axis 134, is substantially rounded with respect to a plane that is substantially perpendicular to the tip axis 134. The rounding of the contact surface 226 can take various forms. For example, the contact surface 226 can be rounded, for example, at its edges while being substantially flat in the middle, or can be continuously curved in a convex surface. The rounding of the contact surface 226 can aid in directing the flow of the welding material. As with the contact surface 26 and 126, contact surface 226 is substantially circular in cross-section and when viewed along the tip axis 234. Concave surfaces 242 surround contact surface 226 and form a "D" shape in that the concave surface 242 forms the arc of the letter "D." Although the tip axis 234 is illustrated as being 30 degrees from the longitudinal base axis 232, other angles are possible, including, for example, 15 degrees.

The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A welding tip for use in a welding machine, said welding tip comprising:
    a base portion including a longitudinal base axis that passes through a center of said base portion; and
    a tip portion extending from said base portion and providing a contact surface, said tip portion including a longitudinal tip axis that passes through a center of said contact surface, and wherein said tip portion has an outer surface that is co-extensive with an adjacent outer surface of said base portion, and a concave surface between a lower shoulder of said base portion and said contact surface;
    said base axis and said tip axis being perpendicular to a transverse axis,
    said base axis and said tip axis being substantially parallel to each other and spaced from each other, and
    said contact surface disposed at an acute angle with respect to said tip axis.

2. The welding tip according to claim 1, wherein said acute angle is about sixty degrees.

3. The welding tip according to claim 1, wherein said contact surface is circular.

4. The welding tip according to claim 1, wherein said contact surface is elliptical.

5. A welding apparatus, comprising:
    an electrode rod; and
    a welding electrode detachably connected to said electrode rod,
    said welding electrode including a mounting portion structured to detachably connect said welding electrode to said electrode rod and a welding tip projecting from said mounting portion,
    said welding tip including:
    a base portion including a longitudinal base axis that passes through a center of said base portion; and
    a tip portion extending from said base portion and providing a contact surface, said tip portion including a longitudinal tip axis that passes through a center of said contact surface,
    said base axis and said tip axis being perpendicular to a transverse axis,
    said base axis and said tip axis being substantially parallel to each other and spaced from each other, and
    said contact surface disposed at an acute angle with respect to said tip axis.

6. The welding apparatus according to claim 5, wherein said welding electrode is a first welding electrode and said welding tip is a first welding tip, and wherein said welding apparatus further comprises a second welding electrode including a second welding tip, said second welding tip having a substantially similar configuration as said first welding tip.

7. The welding apparatus according to claim 5, wherein said acute angle is about sixty degrees.

8. The welding apparatus according to claim 5, wherein said tip portion has an outer surface that is co-extensive with an adjacent outer surface of said base portion.

9. The welding apparatus according to claim 5, wherein said tip portion has a concave surface between a lower shoulder of said base portion and said contact surface.

10. The welding apparatus according to claim 5, wherein said contact surface is circular.

11. The welding apparatus according to claim 5, wherein said contact surface is elliptical.

12. The welding apparatus according to claim 5, wherein said mounting portion has a bent configuration enabling said welding tip to be positioned to contact remote regions inside of a closed section work piece.

13. A welding tip for use in a welding machine, said welding tip comprising:
    a base portion including a base axis that passes through a center of said base portion; and
    a tip portion extending from said base portion and providing a contact surface, said tip portion including a tip axis that passes through said contact surface,
    said base axis and said tip axis being perpendicular to a transverse axis,
    said base axis and said tip axis being substantially parallel to each other and spaced from each other, and
    said contact surface disposed at an acute angle with respect to said tip axis and said contact surface being asymmetric with respect to said base axis.

14. The welding tip according to claim 13, wherein said acute angle is about sixty degrees.

15. The welding tip according to claim 13, wherein said tip portion has an outer surface that is co-extensive with an adjacent outer surface of said base portion.

16. The welding tip according to claim 13, wherein said tip portion has a concave surface between a lower shoulder of said base portion and said contact surface.

17. The welding tip according to claim 13, wherein said contact surface is spaced from said base axis.

18. The welding tip according to claim 13, wherein said contact surface is circular.

19. The welding tip according to claim 13, wherein said contact surface is elliptical.

* * * * *